United States Patent
Newman et al.

(10) Patent No.: US 10,054,199 B2
(45) Date of Patent: Aug. 21, 2018

(54) DRIVE BELT TENSIONING DEVICE

(71) Applicants: Jody William Newman, Consul (CA); Bill Newman, Swift Current (CA)

(72) Inventors: Jody William Newman, Consul (CA); Bill Newman, Swift Current (CA)

( * ) Notice: Subject to any disclaimer, the term of this patent is extended or adjusted under 35 U.S.C. 154(b) by 139 days.

(21) Appl. No.: 15/238,699

(22) Filed: Aug. 16, 2016

(65) Prior Publication Data

US 2018/0051779 A1     Feb. 22, 2018

(51) Int. Cl.
F16H 7/22 (2006.01)
F16H 7/14 (2006.01)
F16H 7/12 (2006.01)
F16H 7/08 (2006.01)

(52) U.S. Cl.
CPC ... F16H 7/1281 (2013.01); *F16H 2007/0806* (2013.01); *F16H 2007/0842* (2013.01); *F16H 2007/0865* (2013.01); *F16H 2007/0893* (2013.01); *F16H 2007/0897* (2013.01)

(58) Field of Classification Search
CPC .................. F16H 7/0827; F16H 7/1281; F16H 2007/0893; F16H 2007/0806; F16H 2007/0808
USPC .......................................................... 474/119
See application file for complete search history.

(56) References Cited

U.S. PATENT DOCUMENTS

| | | | | |
|---|---|---|---|---|
| 932,000 A * | 8/1909 | Cressman | ............. | F16H 7/0827 474/119 |
| 1,727,933 A * | 9/1929 | Mitchell | ............... | F16H 7/1281 192/224.1 |
| 2,195,229 A * | 3/1940 | Smart | ....................... | F16H 7/02 474/119 |
| 2,488,765 A * | 11/1949 | Couse | ................... | F16H 7/0827 474/110 |
| 2,504,624 A * | 4/1950 | Barnes | ...................... | F16H 7/22 474/109 |
| 3,464,282 A * | 9/1969 | Grobowski | ............... | F16H 7/02 474/135 |
| 3,479,894 A * | 11/1969 | Cofer | .................... | F16H 7/1281 474/135 |
| 4,036,070 A * | 7/1977 | Knight | .................. | F16H 7/0827 474/119 |
| 4,324,552 A * | 4/1982 | Boushek, Jr. | .......... | A01D 69/00 474/115 |
| 4,498,889 A * | 2/1985 | Stevens | .................... | F16H 9/14 474/133 |
| 4,723,933 A * | 2/1988 | Marto | ................... | B60K 25/06 192/99 S |

(Continued)

Primary Examiner — Henry Y Liu
(74) *Attorney, Agent, or Firm* — Richard D. Okimaw (57) ABSTRACT

A drive belt compensating tensioning device, comprising: a base frame portion comprising a square or rectangular planar bottom surface and a top surface; a vertical frame portion affixed to the base frame portion forming about a 90 degree angle with the base frame portion thereof; a pivot assembly affixed to a top end of the vertical frame portion; a tensioner arm horizontally pivotally affixed to the pivot assembly; a belt tensioning wheel rotatably affixed to the tensioner arm; a lower pivot arm rotatably affixed to the base frame portion; a cam adjustment portion rotatably affixed to a first aperture of the lower pivot arm; a first horizontal frame portion comprising an lower pivot arm engagement portion; and a spring comprising a spring first end and a spring second end.

20 Claims, 6 Drawing Sheets

(56) References Cited

U.S. PATENT DOCUMENTS

| | | | | |
|---|---|---|---|---|
| 4,803,804 | A * | 2/1989 | Bryant | B65G 23/44 198/813 |
| 5,002,519 | A * | 3/1991 | Oshima | F16H 7/0827 474/134 |
| 5,012,632 | A * | 5/1991 | Kuhn | A01D 34/76 474/135 |
| 5,199,502 | A * | 4/1993 | Hirata | A01B 33/028 172/125 |
| 5,354,241 | A * | 10/1994 | Trefz | F16H 7/0827 474/101 |
| 6,165,089 | A * | 12/2000 | McGreal | F16H 7/1263 474/101 |
| 6,176,071 | B1 * | 1/2001 | Thorman | A01D 34/76 474/135 |
| 6,334,292 | B1 * | 1/2002 | Walch | A01D 34/76 56/10.2 R |
| 6,398,681 | B1 * | 6/2002 | Wanie | F16H 7/1263 474/101 |
| 7,686,720 | B2 * | 3/2010 | Nikolai | F02B 63/04 180/53.1 |
| 8,057,335 | B1 * | 11/2011 | Langenfeld | A01D 69/06 474/119 |
| 8,888,625 | B2 * | 11/2014 | Lehman | A01D 45/023 474/117 |
| 2004/0033852 | A1 * | 2/2004 | Taomo | B23D 47/12 474/101 |
| 2007/0125055 | A1 * | 6/2007 | Ducoulombier | A01D 43/081 56/11.6 |
| 2011/0294614 | A1 * | 12/2011 | Bigler | F16H 7/1281 474/133 |
| 2014/0051534 | A1 * | 2/2014 | Wiebe | F16H 7/1281 474/135 |

* cited by examiner

DRIVE BELT TENSIONING DEVICE

FIELD OF THE INVENTION

The present disclosure is in the field of drive belt tensioning devices, and in particular, oil pump jack drive belt tensioner devices.

BACKGROUND OF THE DISCLOSURE

Drive belts may be tensioned or replaced by moving the drive motor or another axial drive point to apply tension to the drive belt. This method can result in injuries when an operator's fingers are caught and/or pinched. In the oil industry, oil field pump jacks employ an oil field pump jack motor and a drive belt to power the pump jack. Over time these heavy duty drive belts become slack due to overuse, stretching, vibrations, heat and poor tension. Moreover, there is a need to alleviate the issues with belts slipping do to operating during wet conditions resulting in burnt belts that need to be replaced. Therefore, operators must be onsite at an oil field pump jack for regular belt tensioning adjustments and drive belt replacements.

Therefore, a drive belt tensioning device is needed that affords convenient and safe methods for applying reliable and consistent chive belt tension and for safely and quickly replacing worn drive belts.

SUMMARY OF THE INVENTION

A drive belt compensating tensioning device, comprising: a) a base frame portion comprising a square or rectangular planar bottom surface and a top surface; b) a vertical frame portion affixed to the base frame portion forming about a 90 degree angle with the base frame portion thereof; c) a pivot assembly affixed to a top end of the vertical frame portion; d) a tensioner arm horizontally pivotally affixed to the pivot assembly; e) a belt tensioning wheel rotatably affixed to the tensioner arm; f) a lower pivot arm rotatably affixed to the base frame portion; g) a cam adjustment portion rotatably affixed to a first aperture of the lower pivot arm; h) a first horizontal frame portion comprising an lower pivot arm engagement portion; and i) a spring comprising a spring first end and a spring second end.

DETAILED DESCRIPTION OF THE EMBODIMENTS

The following is a detailed description of certain specific embodiments of a drive belt compensating tensioning device and methods as disclosed herein.

In one aspect, disclosed herein is a drive belt compensating tensioning device, comprising: a) a base frame portion comprising a square or rectangular planar bottom surface and a top surface; b) a vertical frame portion affixed to the base frame portion forming about a 90 degree angle with the base frame portion thereof; c) a pivot assembly affixed to a top end of the vertical frame portion; d) a tensioner arm horizontally pivotally affixed to the pivot assembly, wherein the tensioner arm is capable being rotated about the tensioner arm pivot assembly; e) a belt tensioning wheel rotatably affixed to the tensioner arm, wherein the belt tensioning wheel is adjacent to a drive belt; f) a lower pivot arm rotatably affixed to the base frame portion at a distance from the belt tensioning wheel; g) a cam adjustment portion rotatably affixed to a first aperture of the lower pivot arm, wherein the cam adjustment portion comprises a middle cam aperture and a lower cam aperture, and wherein the cam adjustment portion comprises a handle; h) a first horizontal frame portion comprising a lower pivot arm engagement portion; and i) a spring comprising a spring first end and a spring second end, wherein the spring first end is affixed to a second end of the tensioner arm and the spring second end is affixed to a first end of the cam adjustment portion, wherein the cam adjustment portion is capable of being positioned in a belt tensioning position, a belt loosening position or a belt replacement position.

Figure 1:
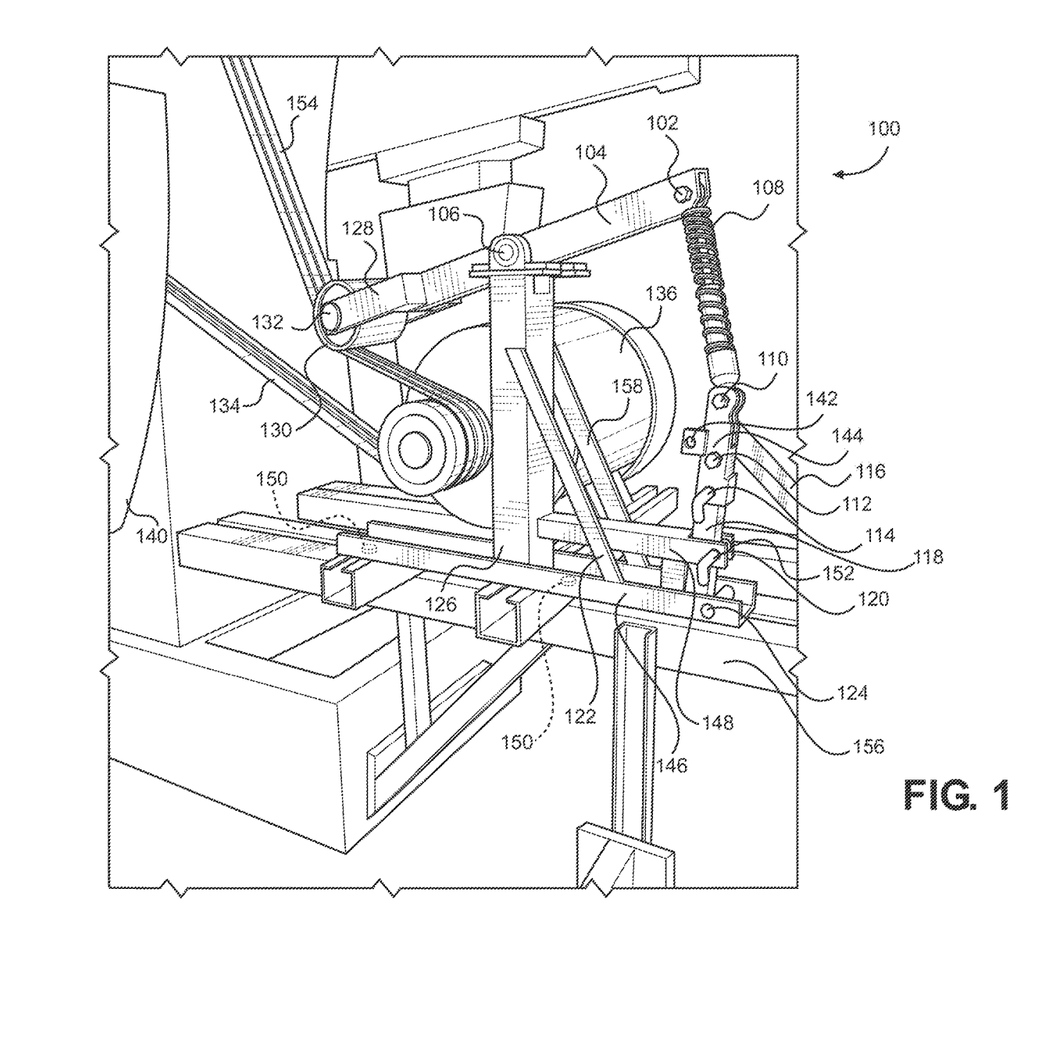
FIG. 1 is side perspective view of a drive belt compensating tensioning device 100 engaged with an oil field pump jack motor 136 and an upper outside portion 154 of the drive belt 134.
Figure 2:
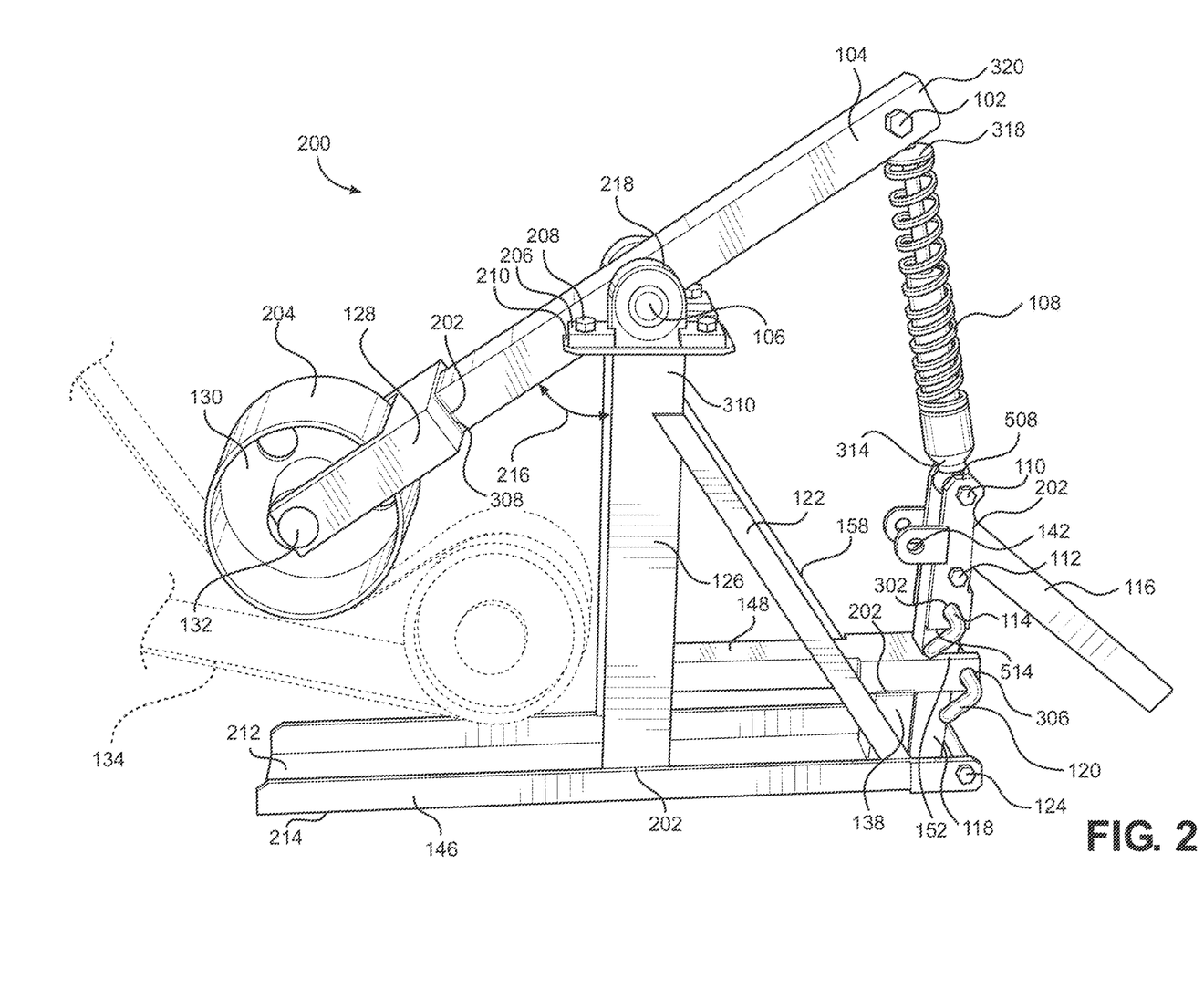
FIG. 2 is side perspective view of a drive belt compensating tensioning device 200 in a belt tensioning position.

Turning to the drawings, FIG. 1 is a side view of a drive belt compensating tensioning device 100 in operation and engaged with an oil field pump jack motor 136 of an oil field pump jack 140 and an upper outside portion 154 of the drive belt 134. In some embodiments, the base plate is affixed to an oil field pump jack base 156 adjacent to an oil field pump jack motor with one or more fasteners 150, and wherein the belt tensioning wheel is adjacent to and positioned to be rotatably engaged with an upper outside portion of the drive belt. In some embodiments, the fasteners 150 are comprise of nuts and/or bolts or another suitable fastener. FIG. 2 is side perspective view of a drive belt compensating tensioning device 200 in a belt tensioning position. As depicted, the drive belt compensating tensioning device 100 comprises a base frame portion 146, a vertical frame portion 126 affixed to the base frame portion 146 in a vertical position. In some embodiments, the vertical frame portion 126 is supported by a first angle frame support 122 and a second angled frame support 158. The base frame portion 146 comprises an upper side 212 and a backside 214. In some embodiments, the drive belt compensating tensioning device 100 comprises a first horizontal frame portion 148 comprising a lower pivot arm engagement portion 152. In some embodiments, the first horizontal frame portion 148 is affixed to a first horizontal frame support portion 138 affixed to the base frame portion 146 and the first horizontal frame portion 148. The base frame portion 146 is affixed to an oil field pump jack base 156 via a plurality of fasteners 150. In some embodiments, the base frame portion comprises a plurality of slots for bolts whereby the position of the base frame portion can be adjusted relative to an oil field pump jack motor and the drive belt. The vertical frame portion 126 comprises a pivot assembly 106 affixed to a top end of the vertical frame portion 126, whereby a tensioner arm 104 is horizontally and pivotally affixed to the pivot assembly 106 thereby representing a tensioner arm pivot point. The tensioner arm 104 is capable pivoting via the pivot assembly 106 between a tensioner arm angle 216. In some embodiments, the tensioner arm angle 216 is between about 25 degrees and 145 degrees.

Moreover, the tensioner arm 104 comprises a belt tensioning wheel 130 rotatably affixed to a first end 308 of the tensioner arm 104, whereby the belt tensioning wheel 130 is rotatably affixed to opposed belt tensioning wheel forks 128 that are affixed to the first end 308 of the tensioner arm 104. In some embodiments, the belt tensioning wheel comprises a cylindrical roller surface for engaging the drive belt. In some embodiments, the belt tensioning wheel comprises a cylindrical roller surface for engaging and applying tension to the drive belt and is rotatably engaged about an axis of the cylindrical surface so as to roll on the belt. In some embodiments, the belt tensioning wheel comprises a cylindrical roller surface for engaging and applying tension to the drive belt and is rotatably engaged about an axis of the cylindrical surface so as to roll on the belt, and wherein a drive shaft of the belt tensioning wheel is affixed to opposed belt tensioning wheel forks affixed to a first end of the tensioner arm. The drive belt compensating tensioning device 100 employs a spring 108 comprising a spring first end 318 and a spring second end 314, wherein the spring 108 first end 318 is rotatably affixed to a second end 320 of the tensioner arm 104 and the spring 108 second end 314 is rotatably affixed to a first end 508 of the cam adjustment portion 144 via fasteners 102 and 110, respectively. The fasteners 102 and 110 are comprised of nuts and/or bolts or another suitable fastener. In some embodiments, the spring is a coil over shock absorber comprising a shock absorber first end and a shock absorber second end.

During operation, with the drive belt compensating tensioning device 100 in the belt tensioning position of FIGS. 1 and 2, whereby the in the belt tensioning wheel 130 is adjacent to and positioned to be rotatably engaged with an upper outside portion 154 of the drive belt 134 as depicted with FIG. 1. In this manner, the spring 108 is positioned to press on the second end 320 of the tensioner arm 104 via the rotational engagement with the pivot assembly 106 and accordingly the tensioner arm angle 216 is reduced thereby applying compensating tension to the drive belt 134. The belt tensioning wheel 130 employs an axial or bearings 132 and rotatably affixed to a pair of opposed belt tensioning wheel forks 128. In some embodiments, the pivotally affixed tensioner arm extends from the first end of the tensioner arm affixed to the spring to the pivot assembly to the second end of the tensioner arm belt and the tensioning wheel for supporting the belt tensioning wheel rotatably engaged with an upper outside portion of the drive belt. In some embodiments, the pivotally affixed tensioner arm extends from the first end of the tensioner arm affixed to the spring to the pivot assembly to the second end of the tensioner arm belt and the tensioning wheel, and wherein the pivotal movement of the tensioner arm about a tensioner arm angle so as to move the roller closer to and further from the belt. In some embodiments, the pivotally affixed tensioner arm extends from the first end of the tensioner arm affixed to the spring to the pivot assembly to the second end of the tensioner arm belt and the tensioning wheel, wherein the pivotal movement of the tensioner arm about a tensioner arm angle so as to move the roller closer to and further from the belt wherein the spring applies a force to the tensioner arm to exert tension to the drive belt via the tensioning wheel pressing against the drive belt.

FIG. 1 depicts the drive belt compensating tensioning device 100 in the belt tensioning position which employs a lower cam latch 114 via the cam adjustment portion 144. In the belt tensioning position depicted with FIG. 2 and in view of FIGS. 5A and 5B, the lower cam latch 114 employs a second aperture 502 of the lower pivot arm 118 engaged via a latch 322 with a lower cam aperture 302 of the cam adjustment portion 144. In some embodiments, the belt tensioning position comprises i) a second aperture of the lower pivot arm engaged with the lower cam aperture of the cam adjustment portion, wherein the cam adjustment portion comprises a latch portion engaged with the second aperture of the lower pivot arm; and ii) a lower pivot arm is engaged with the pivot arm cavity and a pivot arm cavity latch that is capable of holding the lower pivot arm in a stationary vertical position. In some embodiments, the lower pivot arm comprises a second aperture capable of engaging with the lower cam aperture of the cam adjustment portion. In some embodiments, the lower pivot arm engagement portion comprises a pivot arm cavity capable of supporting the lower pivot arm in a stationary vertical position. Moreover, as depicted with FIGS. 1, 2 and 5, the drive belt compensating tensioning device depicts the lower pivot arm engagement portion 152 comprises a pivot arm cavity 518 with pivot arm cavity apertures 306 capable of supporting the lower pivot arm 118 in a stationary vertical position via a pivot arm cavity latch 120. In some embodiments, the lower pivot arm engagement portion comprises a pivot arm cavity, and wherein the pivot arm cavity comprises a pivot arm cavity latch capable of supporting the lower pivot arm in a stationary vertical position. In the belt tensioning position with the spring is compressed to provide the compensating tension to the drive belt. In some embodiments, the belt tensioning position comprises i) a second aperture of the lower pivot arm engaged with the lower cam aperture of the cam adjustment portion, wherein the cam adjustment portion comprises a latch portion engaged with the second aperture of the lower pivot arm; and ii) a lower pivot arm is engaged with the pivot arm cavity and a pivot arm cavity latch that is capable of holding the lower pivot arm in a stationary vertical position.

FIG. 2 depicts the view of a drive belt compensating tensioning device 200 in a belt tensioning position whereby the pivot assembly 106 is affixed to an "H" shaped surface 210 via a plurality of fasteners 208 and a plurality of feet 206 to an upper end 310 of the vertical frame portion 126. In some embodiments, the plurality of fasteners 208 are each comprised of bolts and nuts or another suitable fastener. In some embodiments, the pivot assembly 106 comprises a pair of opposed pillow block bearings for supporting a pivot assembly shaft therebetween and engaged with the tensioner arm 104 via tensioner arm pivot apertures 218. In some embodiments, the pivot assembly comprises a pair of opposed pillow block bearings for supporting a pivot assembly shaft, wherein the pivot assembly shaft is rotatably engaged with the tensioner arm about a tensioner arm angle. Moreover, the drive belt compensating tensioning device 200 as disclosed herein is fabricated with aluminum, steel, stainless steel or a combination thereof and may contain a plurality of welds 202.

Figure 3:
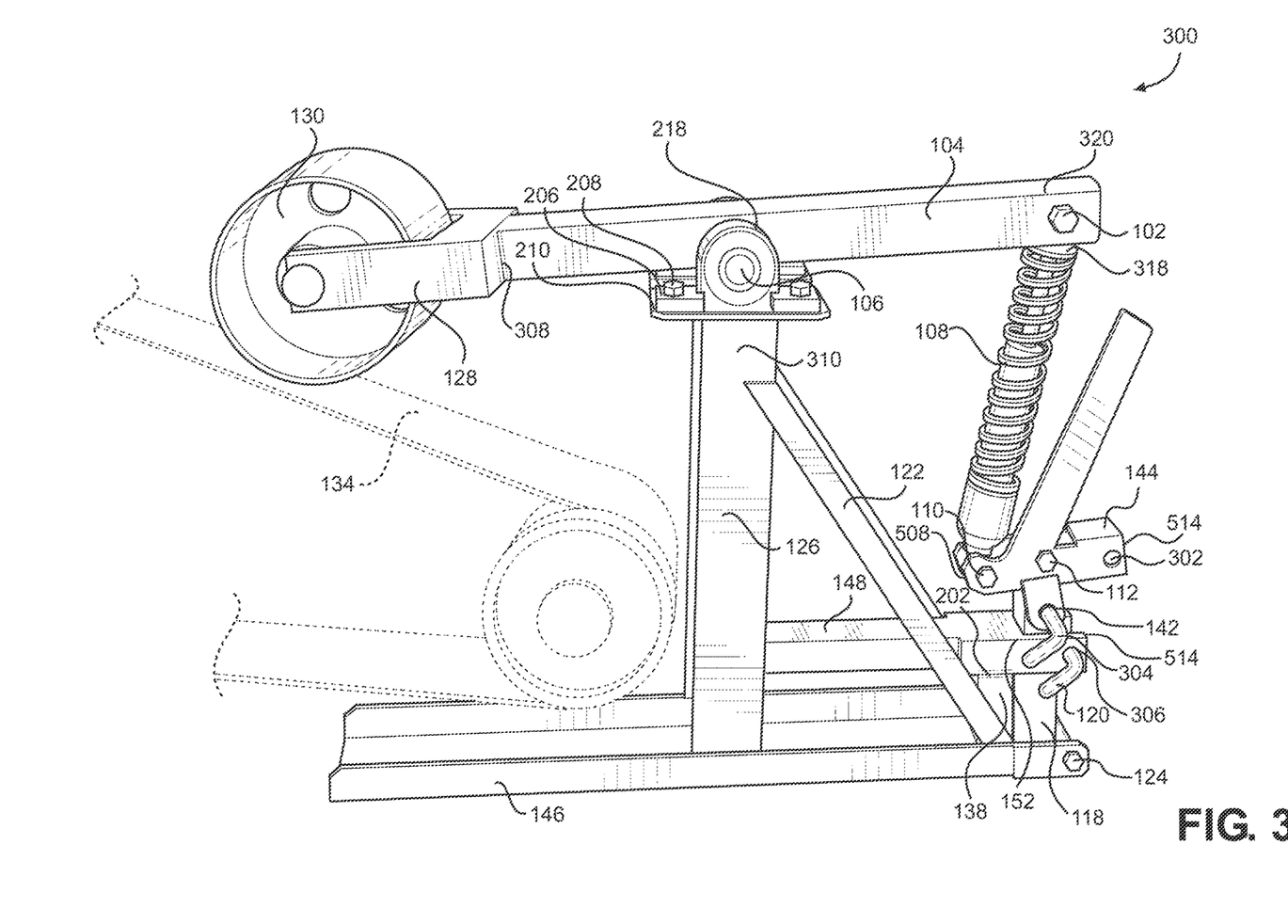
FIG. 3 is side perspective view of a drive belt compensating tensioning device 300 in a belt loosening position.
Figure 5A:
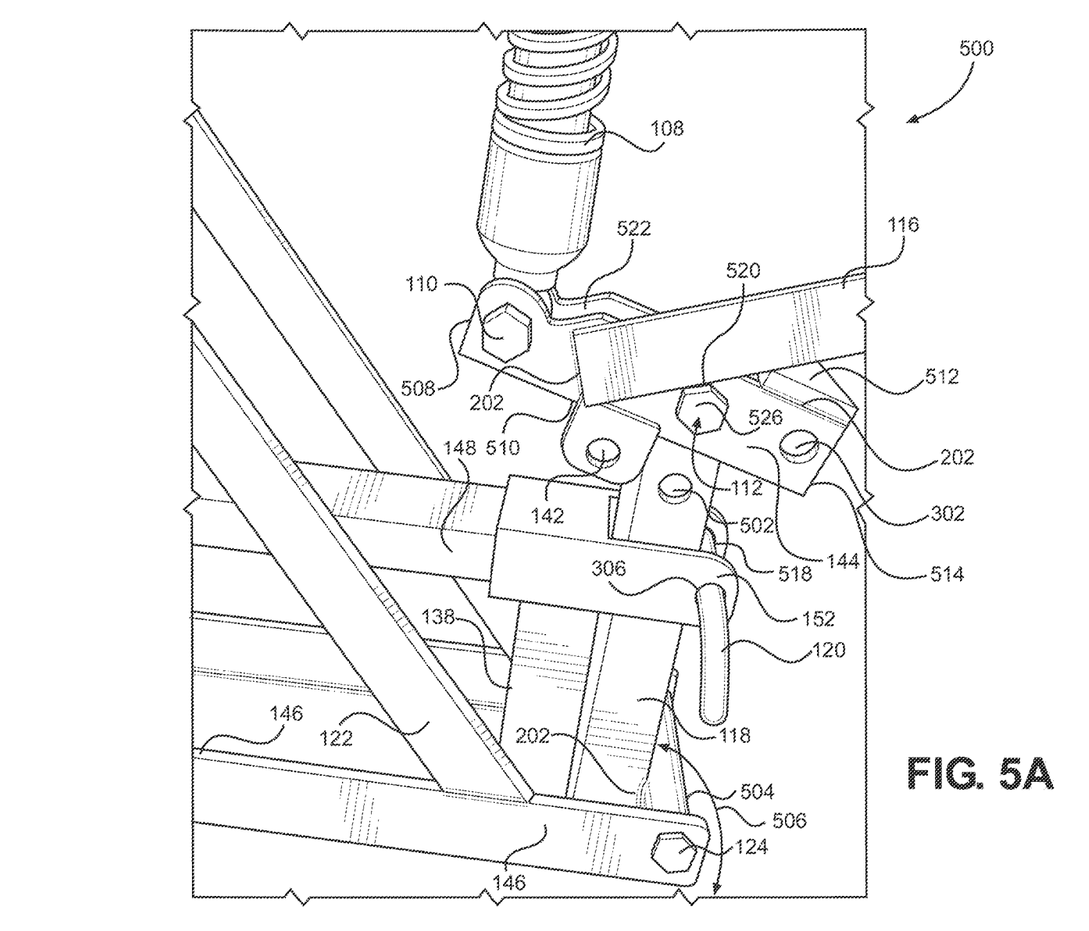
FIG. 5A is a partial view of a drive belt compensating tensioning device 500 comprising a handle 116, a middle cam aperture 142 and a lower cam aperture 302.
Figure 5B:
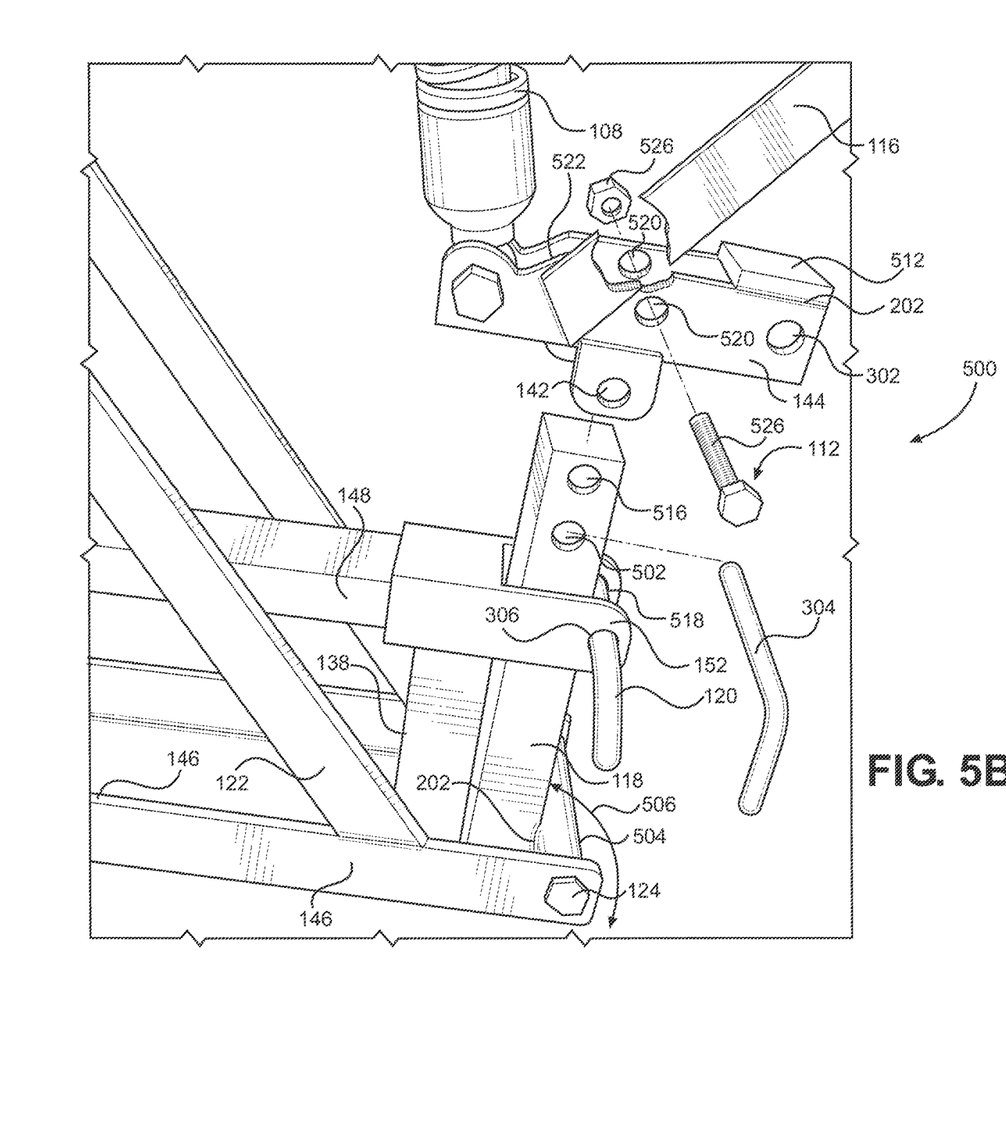
FIG. 5B is a cutaway partial view of a drive belt compensating tensioning device 500 comprising a handle 116, a middle cam aperture 142 and a lower cam aperture 302.

Turning to FIGS. 3, 5A and 5B, FIG. 3 is side perspective view of a drive belt compensating tensioning device 300 in a belt loosening position and FIGS. 5A and 5B are partial views of a drive belt compensating tensioning device 500 comprising a handle 116, a middle cam aperture 142 and a lower cam aperture 302. The cam adjustment portion 144 is rotatably affixed to a first aperture 516 of the lower pivot arm 118, wherein the cam adjustment portion 144 comprises a middle cam aperture 142 and a lower cam latch 114, and wherein the cam adjustment portion 144 comprises a handle 116. The cam adjustment portion 144 is affixed to the lower pivot arm 118 via a rotational cam mount 112, wherein the rotational cam mount 112 of the cam adjustment portion 144 comprises a rotational cam aperture 520 engaged with a first aperture 516 of the lower pivot arm 118. The lower pivot arm 118 is capable of being rotating about and angle 506 via the bearing 124 and/or axial 504. In some embodiments, the lower pivot arm 118 is capable of being rotating about and angle 506 of between about 90 degrees and 5 degrees. Turning to FIG. 3, the cam adjustment portion 144 has been rotated clockwise relative to the belt tensioning position of FIGS. 1 and 2 and the middle cam aperture 142 is engaged with the second aperture 502 of the lower pivot arm 118 via the pivot arm cavity latch 120. In some embodiments, the lower pivot arm comprises a second aperture capable of engaging with the middle cam aperture of the cam adjustment portion. In some embodiments, the lower pivot arm comprises a second aperture capable of engaging with the middle cam aperture of the cam adjustment portion, and wherein the middle cam aperture of the cam adjustment portion comprises a latch portion capable of engaging with the second aperture of the lower pivot arm. Therefore, adjusting the positioning from the belt tensioning position of FIGS. 1 and 2 to the belt loosening position of FIG. 3 involves disengagement of the latch 114, rotation of the cam adjustment portion 144 counterclockwise to the position depicted in FIG. 3 and then engage the middle cam aperture 142 with the second aperture 502 of the lower pivot arm 118 via the pivot arm cavity latch 304. In some embodiments, the belt loosening position comprises i) a second aperture of the lower pivot arm engaged with the middle cam aperture of the cam adjustment portion, wherein the cam adjustment portion comprises a latch portion engaged with the second aperture of the lower pivot arm. In some embodiments, the belt loosening position comprises i) a second aperture of the lower pivot arm engaged with the middle cam aperture of the cam adjustment portion, wherein the cam adjustment portion comprises a latch portion engaged with the second aperture of the lower pivot arm; and ii) a lower pivot arm is disengaged with the pivot arm cavity and a pivot arm cavity latch. In some embodiments, following the engagement of the middle cam aperture 142 with the second aperture 502, the pivot arm cavity latch 120 is disengaged. In some embodiments, the lower pivot arm engagement portion comprises a pivot arm cavity, wherein the pivot arm cavity comprises a pivot arm cavity latch capable of holding the lower pivot arm in a stationary vertical position, wherein the pivot arm cavity latch may be disengaged, and wherein the lower pivot arm is capable of rotation to rotate the lower pivot arm from the pivot arm cavity about a lower pivot arm angle.

Figure 4:
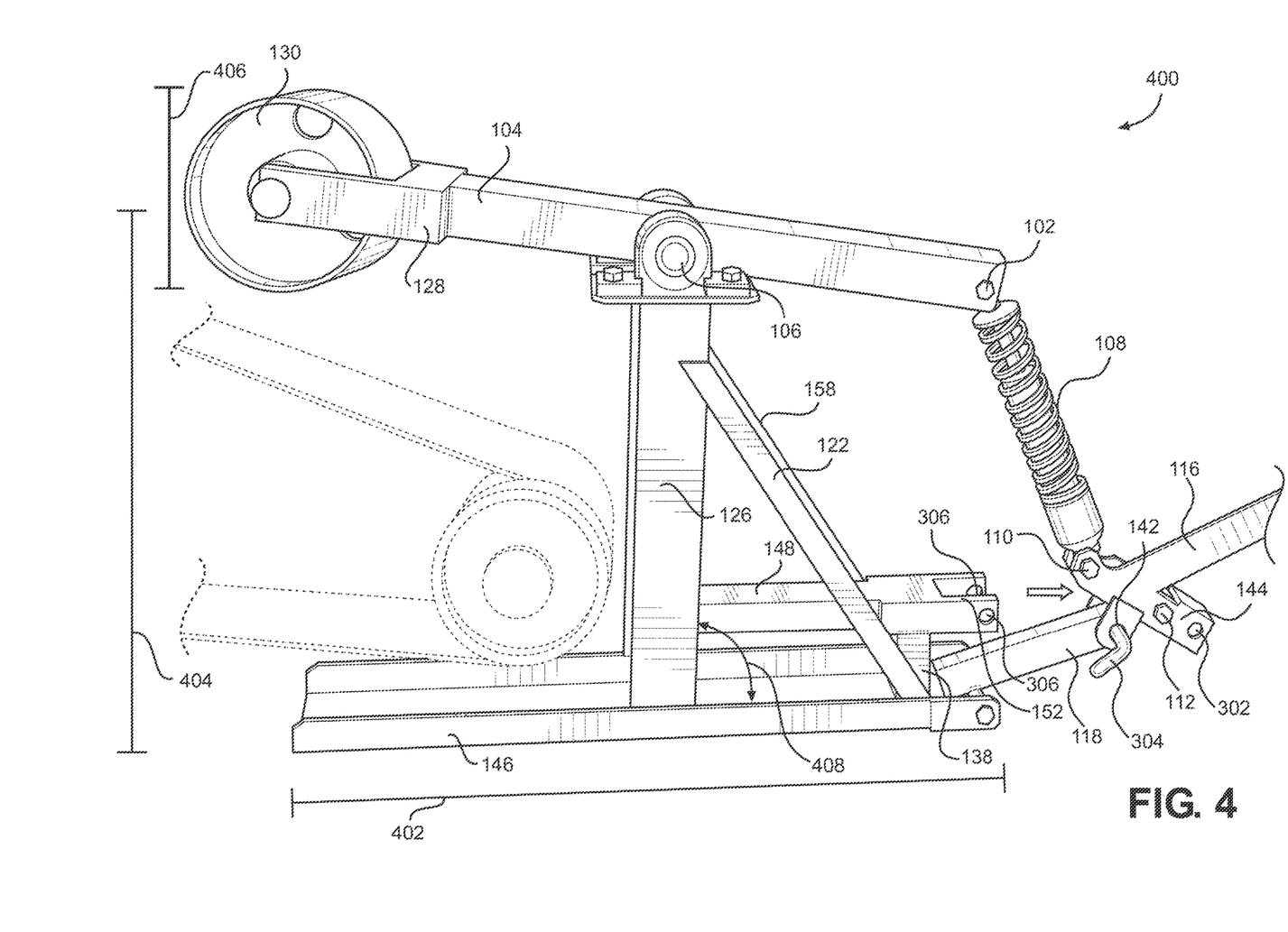
FIG. 4 is side perspective view of a drive belt compensating tensioning device 400 in a belt replacement position.

Turning to FIG. 4, the drive belt compensating tensioning device 400 is depicted in a belt replacement position. In this position, the drive belt compensating tensioning device 400 with the middle cam aperture 142 engaged with the second aperture 502 of the lower pivot arm 118 via the pivot arm cavity latch 304 from the belt loosening position of the drive belt compensating tensioning device 300. In some embodiments, the belt replacement position comprises i) a second aperture of the lower pivot arm engaged with the lower cam aperture of the cam adjustment portion, wherein the cam adjustment portion comprises a latch portion engaged with the second aperture of the lower pivot arm; and ii) a lower pivot arm is disengaged with the pivot arm cavity and a pivot arm cavity latch, wherein the low pivot arm is rotated about a lower pivot arm angle. The pivot arm cavity latch 120 is disengaged in the belt replacement position and the lower pivot arm 118 is positioned to reduce the lower pivot arm angle 506, whereby the angled movement away from the vertical frame portion 126 resulting in the tensioner arm angle 216 is increased whereby the belt tensioning wheel 130 is raised by a distance 404 of between about 12 inches and 48 inches. In some embodiments, the belt tensioning wheel 130 is raised by a distance 404 of between about 24 inches Moreover, the drive belt compensating tensioning device 400 has a distance 402 between the belt tensioning wheel 130 and the lower pivot arm 118 of between about 12 inches and 48 inches. In some embodiments, the distance 402 between the belt tensioning wheel 130 and the lower pivot arm 118 is about 29 inches. The vertical frame portion 126 is affixed at an angle 408. In some embodiments, the vertical frame portion 126 is affixed at an angle 408 of between about 45 degrees and 90 degrees. The belt tensioning wheel 130 has a diameter 406. Therefore, with the use of the drive belt compensating tensioning device 100 as disclosed herein is capable of providing a suitable amount of tension to the drive belt and with the use of the cam adjustment portion 144 the drive belt can be easily replaced by rotating the cam adjustment portion 144 mechanism from the belt tensioning position of FIGS. 1 and 2, to the belt loosening position of FIG. 3, and finally to the belt replacement position of FIG. 4 in order to safely remove tension from the drive belt and then replace the drive belt.

Turning to the drawings, FIGS. 5A and 5B depict partial views of a drive belt compensating tensioning device 500 comprising a handle 116, a middle cam aperture 142 and a lower cam aperture 302. The cam adjustment portion 144 comprises an upper end 508, a lower end 514, a front side 510 and a back side comprising a cam adjustment stop 512, whereby the cam adjustment portion 144 comprises a cam adjustment cavity 522 capable of rotating about and encompassing the second aperture 502 and the first aperture 516 of the lower pivot arm 118. The cam adjustment portion 144 is fabricated from steel plate, aluminum plate or stainless steel plate welded together to form a hollow frame comprises apertures for affixing the cam adjustment portion 144 to the spring 108 and the lower pivot arm 118 as illustrated with FIGS. 5A and 5B. The rotational cam mount 112 is comprised of rotational cam mount apertures 520, a shaft or bolt and nut 526, and the first apertures 516 of the lower pivot arm 118. The cam adjustment stop 512 prevents the cam adjustment portion 144 from rotating clockwise past the alignment position of the lower cam aperture 302 and the second aperture 502 of the lower pivot arm 118.

Definitions

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

The present disclosure is not to be limited in terms of the particular embodiments described in this application. Many modifications and variations can be made without departing from its spirit and scope, as will be apparent to those skilled in the art. Functionally equivalent methods and devices within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or devices, which can of course vary. It is also to be understood that the terminology used herein is for the purpose of describing particular embodiments only, and is not intended to be limiting.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict any definitions in this disclosure.

What is claimed is:

1. A drive belt compensating tensioning device, comprising:
   a) a base frame portion comprising a square or rectangular planar bottom surface and a top surface;
   b) a vertical frame portion affixed to the base frame portion forming about a 90 degree angle with the base frame portion thereof;
   c) a pivot assembly affixed to a top end of the vertical frame portion;
   d) a tensioner arm horizontally pivotally affixed to the pivot assembly, wherein the tensioner arm is capable being rotated about the tensioner arm pivot assembly;
   e) a belt tensioning wheel rotatably affixed to the tensioner arm, wherein the belt tensioning wheel is adjacent to a drive belt;
   f) a lower pivot arm rotatably affixed to the base frame portion at a distance from the belt tensioning wheel;
   g) a cam adjustment portion rotatably affixed to a first aperture of the lower pivot arm, wherein the cam adjustment portion comprises a middle cam aperture and a lower cam aperture, and wherein the cam adjustment portion comprises a handle;
   h) a first horizontal frame portion comprising an lower pivot arm engagement portion; and
   i) a spring comprising a spring first end and a spring second end, wherein the spring first end is affixed to a second end of the tensioner arm and the spring second end is affixed to a first end of the cam adjustment portion,
   wherein the cam adjustment portion is capable of being positioned in a belt tensioning position, a belt loosening position or a belt replacement position.

2. The tensioning device of claim 1, wherein the base plate is affixed to an oil field pump jack base adjacent to an oil field pump jack motor with one or more fasteners, and wherein the belt tensioning wheel is adjacent to and positioned to be rotatably engaged with an upper outside portion of the drive belt.

3. The tensioning device of claim 1, wherein the lower pivot arm engagement portion comprises a pivot arm cavity capable of supporting the lower pivot arm in a stationary vertical position.

4. The tensioning device of claim 1, wherein the lower pivot arm engagement portion comprises a pivot arm cavity, and wherein the pivot arm cavity comprises a pivot arm cavity latch capable of supporting the lower pivot arm in a stationary vertical position.

5. The tensioning device of claim 1, wherein the lower pivot arm engagement portion comprises a pivot arm cavity, wherein the pivot arm cavity comprises a pivot arm cavity latch capable of holding the lower pivot arm in a stationary vertical position, wherein the pivot arm cavity latch may be disengaged, and wherein the lower pivot arm is capable of rotation to rotate the lower pivot arm from the pivot arm cavity about a lower pivot arm angle.

6. The tensioning device of claim 1, wherein the lower pivot arm comprises a second aperture capable of engaging with the lower cam aperture of the cam adjustment portion.

7. The tensioning device of claim 1, wherein the lower pivot arm comprises a second aperture capable of engaging with the middle cam aperture of the cam adjustment portion.

8. The tensioning device of claim 1, wherein the lower pivot arm comprises a second aperture capable of engaging with the lower cam aperture of the cam adjustment portion, and wherein the lower cam aperture of the cam adjustment portion comprises a latch portion capable of engaging with the second aperture of the lower pivot arm.

9. The tensioning device of claim 1, wherein the lower pivot arm comprises a second aperture capable of engaging with the middle cam aperture of the cam adjustment portion, and wherein the middle cam aperture of the cam adjustment portion comprises a latch portion capable of engaging with the second aperture of the lower pivot arm.

10. The tensioning device of claim 1, wherein the belt tensioning wheel comprises a cylindrical roller surface for engaging the drive belt.

11. The tensioning device of claim 1, wherein the belt tensioning wheel comprises a cylindrical roller surface for engaging and applying tension to the drive belt and is rotatably engaged about an axis of the cylindrical surface so as to roll on the belt.

12. The tensioning device of claim 1, wherein the belt tensioning wheel comprises a cylindrical roller surface for engaging and applying tension to the drive belt and is rotatably engaged about an axis of the cylindrical surface so as to roll on the belt, and wherein a drive shaft of the belt tensioning wheel is affixed to opposed belt tensioning wheel forks affixed to a first end of the tensioner arm.

13. The tensioning device of claim 1, wherein the pivotally affixed tensioner arm extends from the first end of the tensioner arm affixed to the spring to the pivot assembly to the second end of the tensioner arm belt and the tensioning wheel for supporting the belt tensioning wheel rotatably engaged with an upper outside portion of the drive belt.

14. The tensioning device of claim 1, wherein the pivotally affixed tensioner arm extends from the first end of the tensioner arm affixed to the spring to the pivot assembly to the second end of the tensioner arm belt and the tensioning wheel, and wherein the pivotal movement of the tensioner arm about a tensioner arm angle so as to move the roller closer to and further from the belt.

15. The tensioning device of claim 1, wherein the pivotally affixed tensioner arm extends from the first end of the tensioner arm affixed to the spring to the pivot assembly to the second end of the tensioner arm belt and the tensioning wheel, wherein the pivotal movement of the tensioner arm about a tensioner arm angle so as to move the roller closer to and further from the belt wherein the spring applies a force to the tensioner arm to exert tension to the drive belt via the tensioning wheel pressing against the drive belt.

16. The tensioning device of claim 1, wherein the spring is a coil over shock absorber comprising a shock absorber first end and a shock absorber second end.

17. The tensioning device of claim 1, wherein the pivot assembly comprises a pair of opposed pillow block bearings for supporting a pivot assembly shaft, wherein the pivot assembly shaft is rotatably engaged with the tensioner arm about a tensioner arm angle.

18. The tensioning device of claim 1, wherein the belt tensioning position comprises
   i. a second aperture of the lower pivot arm engaged with the lower cam aperture of the cam adjustment portion, wherein the cam adjustment portion comprises a latch portion engaged with the second aperture of the lower pivot arm; and
   ii. a lower pivot arm is engaged with the pivot arm cavity and a pivot arm cavity latch that is capable of holding the lower pivot arm in a stationary vertical position.

19. The tensioning device of claim 1, wherein the belt loosening position comprises
   i. a second aperture of the lower pivot arm engaged with the middle cam aperture of the cam adjustment portion, wherein the cam adjustment portion comprises a latch portion engaged with the second aperture of the lower pivot arm.

20. The tensioning device of claim 1, wherein the belt replacement position comprises
   i. a second aperture of the lower pivot arm engaged with the lower cam aperture of the cam adjustment portion, wherein the cam adjustment portion comprises a latch portion engaged with the second aperture of the lower pivot arm; and
   ii. a lower pivot arm is disengaged with the pivot arm cavity and a pivot arm cavity latch, wherein the low pivot arm is rotated about a lower pivot arm angle.

* * * * *